United States Patent Office 3,311,610
Patented Mar. 28, 1967

3,311,610
6-(2' - PHENYLPYRAZINE - 3' - CARBOXAMIDO)
PENICILLANIC ACIDS AND SALTS THEREOF
Takayuki Naito and Susumu Nakagawa, Tokyo, Japan, assignors to Bristol-Banyu Research Institute, Ltd., Tokyo, Japan, a corporation of Japan
No Drawing. Filed June 8, 1965, Ser. No. 462,389
14 Claims. (Cl. 260—239.1)

This application is a continuation-in-part of our prior, copending application Ser. No. 277,112 filed May 1, 1963, now abandoned.

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive bacteria and, more particularly relates to novel 6 - (2'-phenylpyrazine - 3' - carboxamido)penicillanic acid which may contain certain substituents in the benzene ring, and nontoxic salts thereof.

Antibacterial agents of the penicillin class have proven highly effective in the therapy of infections due to gram-positive bacteria but nearly all such penicillins are ineffective against numerous so-called resistant strains of bacteria, e.g., benzylpenicillin-resistant strains of *Staphylococcus aureus* (*Micrococcus pyogenes* var. aureus). It is the object of the present invention to provide novel compounds which are effective against such resistant strains and are orally active and are decomposed only slowly by aqueous acid. It is a further object of the present invention to provide agents which actually inhibit penicillinase and are thus also useful adjuvants for penicillins such as benzylpenicillin.

The objects of the present invention have been achieved by the provision, according to the present invention, of a member selected from the group consisting of an acid of the formula

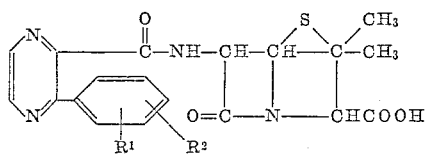

wherein $R^1$ and $R^2$ are each a member selected from the group consisting of hydrogen, trifluoromethyl, chloro, bromo, (lower)alkylthio, (lower)alkylsulfonyl, (lower)alkyl and (lower)alkoxy and nontoxic, pharmaceutically acceptable salts thereof.

The nontoxic, pharmaceutically acceptable salts include metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl - beta - phenethylamine, 1-ephenamine, N,N'-dibenzylethylenediamine, dehydrobietylamine, N,N'-bis - dehydroabietylethylenediamine, N - (lower)alkylpiperidines, e.g., N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxy," it refers to the alkyl portion of such group which is therefore as described above in connection with "(lower) alkyl." Also included within the scope of the present invention are easily hydrolyzed esters and amides which are converted to the free acid form by chemical or enzymatic hydrolysis.

The preferred compound of the present invention has the formula above wherein $R^1$ and $R^2$ are each hydrogen and is named 6-(2'-phenylpyrazine-3'-carboxamido)penicillanic acid.

The products of the present invention are prepared by the reaction of 6-aminopenicillanic acid, preferably in the form of a neutral salt such as the sodium salt or the triethylamine salt, with an acid chloride having the formula

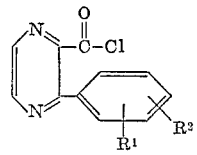

wherein $R^1$ and $R^2$ have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid. In addition, an acid azide or an active ester or thioester (e.g., with p-nitrophenol, thiophenol, thioacetic acid) may be used or the free acid itself may be coupled with 6-aminopenicillanic acid by the use of enzymes or of a carbodiimide reagent [cf. Sheehan and Hess, J. Amer. Chem. Soc., 77, 1067 (1955)]. The methods for carrying out these reactions to produce a penicillin and the methods used to isolate the penicillins so produced are well-known in the art.

The novel 2-phenylpyrazine-3-carboxylic acids used to produce the compounds of the present invention are prepared by acid hydrolysis, e.g., heating in 80% sulfuric acid, of the corresponding 2-phenyl-3-cyanopyrazines. These acids are converted to their reactive derivatives, when desired, by the usual methods, e.g., to the acid chloride by heating with thionyl chloride.

The 2-phenyl-3-cyanopyrazines are prepared by the method used by Karmas et al. [J. Amer. Chem. Soc. 74, 1580–1584 (1952), and 78, 2141–2144 (1956)], to prepare 2-phenyl-3-cyanopyrazine itself by refluxing 2-phenyl-3-bromopyrazine (also called 2-bromo-3-phenylpyrazine) with about three moles of cuprous cyanide in γ-picoline, quenching the reaction mixture in cold, aqueous acid (e.g., 4 N, HCl), and extracting the nitrile with an organic solvent such as chloroform from which it is then distilled or crystallized.

The intermediate 2-bromo-3-phenylpyrazines are prepared as described in the literature, e.g., by Karmas et al. (ibid.) or by R. G. Jones [J. Amer. Chem. Soc., 71, 78–81 (1949), and references therein and U.S. Patent 2,520,088], as, for instance, by the following reaction scheme:

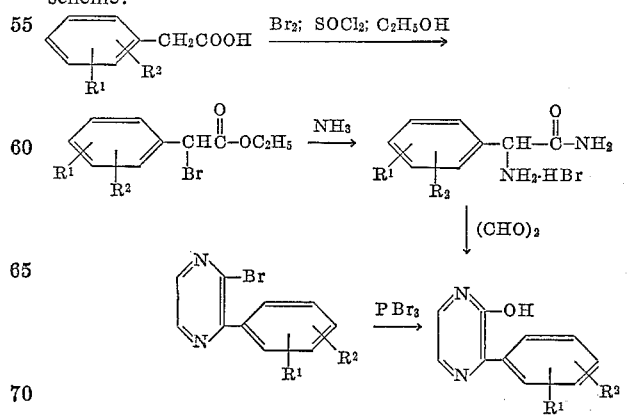

wherein $R^1$ and $R^2$ have the meaning set forth above.

Alternatively, the 2-phenylpyrazine-3-carboxylic acids are prepared by the methods described in the examples below, e.g., by conversion of the appropriate acetophenone to an ester of the substituted benzoylacetic acid and thence to the ester of the substituted benzoylglyoxylic acid and then to the substituted 2-phenylpyrazine-3-carboxylic acid.

The following examples will serve to illustrate this invention without limiting it thereto.

EXAMPLE 1

*Method of preparation of sodium 6-(3'-phenylpyrazine-2'-carboxamido)penicillanate*

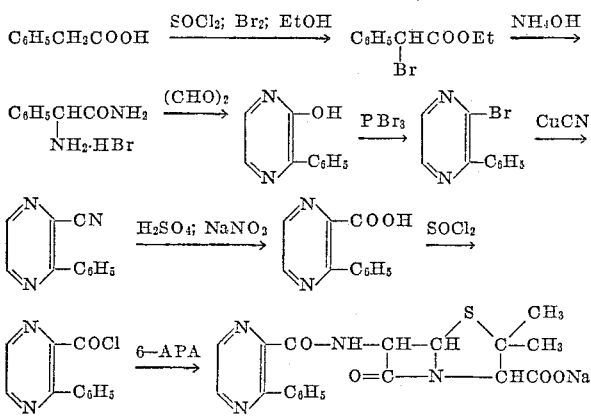

A mixture of 272 g. (2 moles) of phenylacetic acid and 350 ml. (4.8 moles) of thionyl chloride was refluxed for two hours. This reaction mixture was stirred and 340 g. (4.25 moles) of bromine was added dropwise at about 85° C. over a period of one hour. After addition, stirring was continued for 4 hours under reflux. The reaction mixture was cooled in an ice bath and 500 ml. of ethanol was added with vigorous stirring and the mixture was allowed to stand at room temperature overnight. Cold water was added with vigorous agitation and the organic layer was removed. The aqueous layer was extracted twice with ether. The organic layer and the ether extracts were combined, dried over calcium chloride and distilled to give 454 g. ethyl α-bromophenylacetate, B.P. 141–144° C./15 mm.

Ethyl α-bromophenylacetate (49 g., 0.2 mole) was dissolved in 100 ml. of ethanol, cooled to 0° to −5° C. and ammonia gas was bubbled in for five hours. A white precipitate separated at first and then gradually dissolved to give a yellow solution. After standing at 0 to −5° C. for five days, the mixture was treated with active carbon and filtered. The carbon cake was washed with 100 ml. of ethanol. The washings were combined with the filtrate and concentrated to about 50 ml. in vacuo to precipitate the product as a white solid, which was filtered, washed with 50 ml. of ethanol and dried in vacuo. The yield of the product, phenylglycineamide hydrobromide, was 23.5 g., M.P. 268–272° C. (dec.) (in sealed tube).

A suspension of 116 g. (0.5 mole) of phenylglycineamide hydrobromide in 600 ml. of methanol was chilled at −40° C., a solution of 25 g. of sodium hydroxide in 50 ml. of water and 90 g. of 40% glyoxal was added dropwise below −30° C. A solution of 25 g. of sodium hydroxide in 50 ml. of water was again added dropwise to the mixture and the reaction mixture was kept at −5° C. for two hours and then at room temperature for several hours. Addition of 50 ml. of 12 N HCl gave a white precipitate of the product, which was collected by filtration and extracted by boiling chloroform. The chloroform solution was evaporated to dryness and the residue was crystallized from ethyl acetate to give 60 g. 2-phenyl-3-hydroxypyrazine melting at 172–174° C.

A mixture of 55 g. (0.34 mole) of the 2-phenyl-3-hydroxypyrazine and 120 ml. of phosphorous tribromide was stirred and heated at 180° C. for four hours. The dark brown reaction mixture was poured onto crushed ice and extracted with chloroform. The extract was treated with active carbon, dried over anhydrous sodium sulfate and evaporated to dryness. The residue was recrystallized from ethanol to give 44.5 g. of 2-phenyl-3-bromopyrazine, M.P. 88–89.5° C.

A mixture of 11.3 g. (0.05 mole) of the 2-phenyl-3-bromopyrazine and 15 g. of cuprous cyanide in 40 ml. of γ-picoline was heated under reflux and then poured into a cold mixture of 400 ml. of 4 N hydrochloric acid and 100 ml. of chloroform and filtered. The filter cake was thoroughly washed with chloroform. The filtrate and the washings were combined, treated with active carbon and dried over sodium sulfate. 2-phenyl-3-cyanopyrazine was crystallized by evaporating the solvent. Yield 6 g., M.P. 94–96° C.

*Analysis.*—Calcd. for $C_{11}H_7N_3$: C, 72.91; H, 3.89; N, 23.19. Found: C, 72.83, 72.45; H, 3.76, 3.47; N, 22.73, 22.72. $v_{C≡N}$ 2228 cm.$^{-1}$.

A mixture of 6 g. (0.033 mole) of the 2-phenyl-3-cyanopyrazine and 25 ml. of conc. sulfuric acid was heated at about 120° C. for three hours and chilled in an ice-salt bath. A solution of 4.2 g. of sodium nitrite in 10 ml. of water was added dropwise maintaining the temperature of the solution below 20° C. After addition was completed, the mixture was heated on a water bath for three hours and poured onto crushed ice. A precipitate was collected by filtration and washed with water. This product was the monohydrate of 3-phenylpyrazine-2-carboxylic acid. Yield 6 g., M.P. 74–76° C. $v_{C=O}$ 1685 cm.$^{-1}$.

*Analysis.*—Calc'd for $C_{11}H_8N_2O_2 \cdot H_2O$: C, 60.54; H, 4.62; N, 12.84. Found: C, 60.12, 60.33; H, 4.60, 4.40; N, 12.51, 12.76. Recrystallization from benzene gave its anhydrous acid. M.P. 141–142° C., $v_{C=O}$ 1735 cm.$^{-1}$.

*Analysis.*—Calcd. for $C_{11}H_8N_2O_2$: C, 65.99; H, 4.38; N, 13.99. Found: C, 65.87; H, 3.97; N, 13.78.

A mixture of 11 g. (0.05 mole) of the 3-phenyl-pyrazine-2-carboxylic acid and 25 ml. of thionyl chloride was refluxed for one hour. The reaction mixture was evaporated to remove excess of thionyl chloride. The dark oily residue was distilled to give 9.5 gm. 3-phenylpyrazine-2-carboxylic acid chloride, B.P. 142–145° C./4 mm.

A suspension of 10.8 g. (0.05 mole) of 6-APA (6-aminopenicillanic acid) in 50 ml. of water and 50 ml. of acetone was cooled below 0° C. and stirred. A solution of 2 g. (0.05 mole) of sodium hydroxide in 20 ml. of water was added to this suspension. The 6-APA dissolved and a pale yellow solution was obtained. Then there was added 8.4 g. (0.1 mole) of powdered sodium bicarbonate. A solution of 10.9 g. (0.05 mole) of 3-phenylpyrazine-2-carboxylic acid chloride in 20 ml. of dry acetone was added dropwise at 0–2° C. to the 6-aminopenicillanate solution over a period of 20 minutes. After addition was completed, the mixture was stirred at 5–7° C. for one hour. There was added 300 ml. of water below 10° C. The aqueous layer, which was separated and washed with ether and ethyl acetate successively, was layered with 300 ml. of ethyl acetate and acidified to pH 2 by phosphoric acid (3:1) below 5° C. The aqueous phase was again extracted twice with 200 ml. portions of ethyl acetate. The ethyl acetate layer was combined with ethyl acetate extracts, washed with 100 ml. of cold water and dried over anhydrous sodium sulfate. To the filtrate was added 15 ml. of 48% sodium 2-ethylhexanoate solution in methyl isobutyl ketone. Sodium 6-(3'-phenylpyrazine-2'-carboxamido)penicillanate which separated was collected by filtration, washed with ether and dried in vacuo. Yield 18 g. (82% as monohydrate). This product was found to inhibit *Staph. aureus* Smith at 0.39 mcg./ml., to inhibit *Staph. aureus* BX-1633, which is highly resistant to benzylpenicillin, at 1.56 mcg./ml., to exhibit versus *Staph. aureus* BX-1633 in mice a $CD_{50}$ of 10 mgm./kg. upon intramuscular injection (compared to a $CD_{50}$ of 25 mgm./kg. for oxacillin)

and to be quite stable to acid (having a half-life of 90 minutes at pH 2 and 37° C. compared to 7 minutes for benzylpenicillin in a comparative experiment).

EXAMPLE 2

In the procedure of Example 1 there is substituted for the phenylacetic acid an equimolar amount of the acid chloride prepared by treatment with thionyl chloride of 4-trifluoromethylphenylacetic acid,
2-methylphenylacetic acid,
3-methoxyphenylacetic acid,
3,4-dimethoxyphenylacetic acid,
2,6-dimethoxyphenylacetic acid,
2,4-dimethylphenylacetic acid,
2,6-dimethylphenylacetic acid, and
4-isopropylphenylacetic acid, respectively to produce the acids, 6-[2'-(4''-trifluoromethylphenyl)pyrazine-3'-carboxamido]penicillanic acid,
6-[2'-(2''-methylphenyl)pyrazine-3'-carboxamido] penicillanic acid,
6-[2'-(3''-methoxyphenyl)pyrazine-3'-carboxamido] penicillanic acid,
6-[2'-(3'',4''-dimethoxyphenyl)pyrazine-3'-carboxamido] penicillanic acid,
6-[2'-(2'',6''-dimethoxyphenyl)pyrazine-3'-carboxamido] penicillanic acid,
6-[2'-(2'',4''-dimethylphenyl)pyrazine-3'-carboxamido] penicillanic acid,
6-[2'-(2'',6''-dimethylphenyl)pyrazine-3'-carboxamido] penicillanic acid, and
6-[2'-(4''-isopropylphenyl)pyrazine-3'-carboxamido] penicillanic acid, respectively, which are isolated as their water-soluble sodium salts and found to contain the β-lactam structure as shown by infra-red analysis and to inhibit gram-positive bacteria, e.g., *Staph. aureus*, at low concentrations.

EXAMPLE 3

*Method of preparation of sodium 6-[3-(o-chlorophenyl) pyrazine-2-carboxamido]penicillanate*

(A) 2-(o-chlorophenyl)pyrazine-3-carboxylic acid.

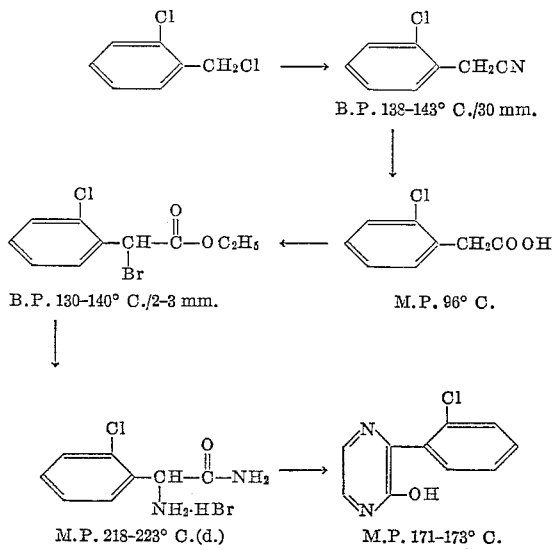

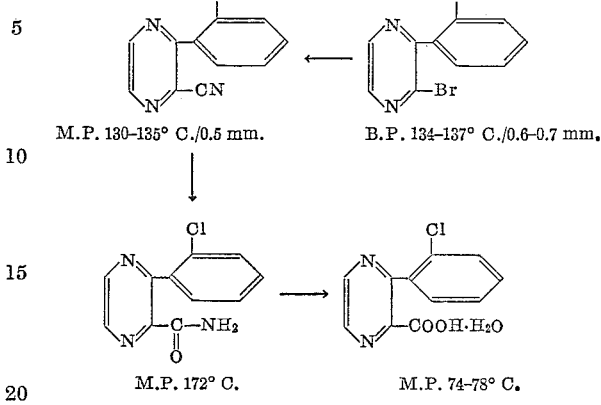

o-Chlorophenylacetic acid was prepared from o-chlorobenzylchloride as illustrated above. α-Bromination and esterification of o-chlorophenylacetic acid were carried out in the usual manner. Treatment of the α-bromoester with conc. ammonium hydroxide or by bubbling of gaseous ammonia into an alcoholic solution of the α-bromoester gave the corresponding glycineamide hydrobromide. A sample of glycine amide hydrobromide was treated with glyoxal at −15° C. and 2-(o-chlorophenyl)-3-hydroxypyrazine was obtained.

The yield of 2-o-chlorophenyl-3-hydroxypyrazine was improved by performing the reaction of glycinamide with glyoxal at −40° C. using Dry Ice-acetone mixture.

The 2-(o-chlorophenyl)-3-hydroxypyrazine was converted to 2-(o-chlorophenyl)-3-bromopyrazine by refluxing with a large excess of phosphorous tribromide. Conversion of 2-(o-chlorophenyl)-3-bromopyrazine into the corresponding nitrile was carried out by using an equivalent amount of cuprous cyanide. Fractionation of the reaction mixture gave 2-(o-chlorophenyl-3-cyanopyrazine, boiling at 130–135° C./0.5 mm.

*Analysis.*—Calc'd for $C_{11}H_6ClN_3$: C, 61.26; H, 2.80; N, 19.51. Found: C, 59.70, 59.54; H, 2.78, 3.01; N, 16.24, 16.20.

These values seemed to indicate that the liquid contained a small amount of bromopyrazine. Hydrolysis of this cyanopyrazine with hydrochloric acid was not successful. When the cyanopyrazine was treated with hydrogen peroxide in sodium hydroxide solution, 2-(o-chlorophenyl)pyrazine-3-carbonyl amide (M.P. 172° C.) was obtained in a good yield. Reaction of the cyanopyrazine with sodium carbonate also afforded larger amounts of the amide as well as a trace of 2-(o-chlorophenyl) pyrazine-3-carboxylic acid. The acid was also obtained by treating 2-(o-chlorophenyl)pyrazine-3-carbonyl amide with nitrous acid. Conversion of the pyrazinamide into 2-o-chlorophenylpyrazine-3-carboxylic acid was alternatively carried out by the action of nitrous acid in concentrated hydrochloric acid and by the use of aqueous potassium hydroxide. The latter gave a quantitative yield. Monohydrate, M.P. 74–78° C. Anhydrous acid, M.P. 138–140° C. Calc'd for $C_{11}H_7ClN_2O_2$: C, 56.30; H, 3.01; N, 11.94. Found: C, 56.31, 56.50; H, 3.06, 2.94; N, 12.02, 12.12.

(B) Sodium 6-[3-(o-chlorophenyl)pyrazine-2-carboxamido]penicillanate.

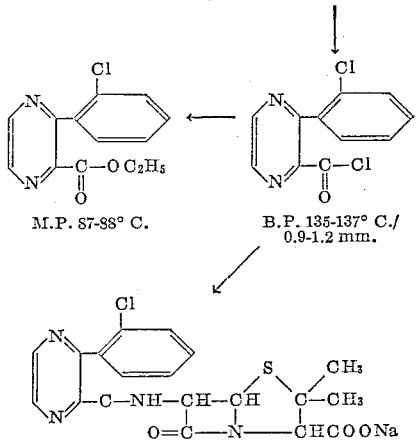

M.P. 87-88° C.  B.P. 135-137° C./ 0.9-1.2 mm.

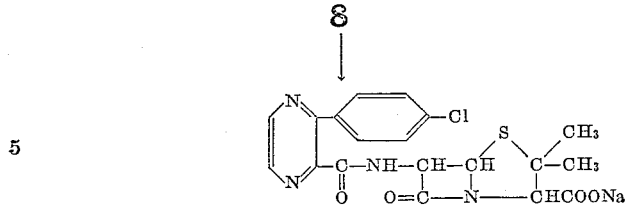

2-(o-chlorophenyl)pyrazine carboxylic acid was converted to the acid chloride with thionyl chloride. A small amount of the acid chloride was esterified to the corresponding ester.

Analysis.—Calc'd for $C_{13}H_{11}ClN_2O_2$: C, 59.43; H, 4.22; N, 10.67. Found: C, 59.34; H, 4.09; N, 10.94, 10.89.

The remain of the acid chloride was used for condensation with 6-aminopenicillanic acid (6-APA). Assay of the penicillanate: $NH_2OH$, 924 mcg./mg.; iod. 835 mcg./mg.; cup, 122 μ./mg.

Analysis.—Calc'd for $C_{19}H_{16}ClN_4O_4SNa \cdot H_2O$: C, 48.25; H, 3.84; N, 11.84. Found: C, 48.79, 49.49; H, 3.95, 3.97; N, 11.18, 11.29.

This product was found to inhibit *Staph. aureus* Smith at about 0.4 mcg./ml., to inhibit *Staph. aureus* BX–1633, which is highly resistant to benzylpenicillin at about 3–12 mcg./ml., to exhibit versus *Staph. aureus* BX–1633 in mice a $CD_{50}$ of about 45–82 mgm./kg. upon intramuscular injection and to be quite stable in acid (having a half-life of 11.3 hours at pH 2 and 37° C. compared to 10 minutes for benzylpenicillin in a comparative experiment).

EXAMPLE 4

*Method of preparation of sodium 6-[3-(p-chlorophenyl) pyrazine-2-carboxamido]penicillanate*

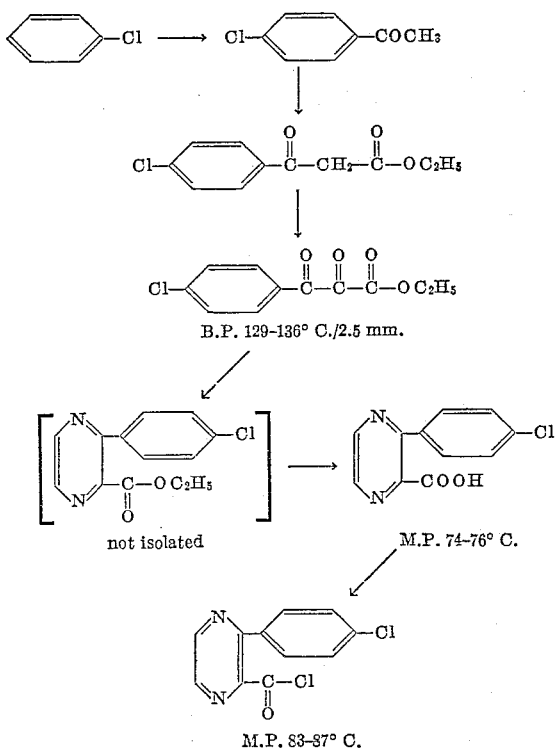

B.P. 129-136° C./2.5 mm.

M.P. 74-76° C.

not isolated

M.P. 83-87° C.

p-Chloroacetophenone was prepared by Friedel-Craft reaction of chlorobenzene and it was then reacted with ethyl carbonate in the presence of sodium ethoxide to give ethyl p-chlorobenzoylacetate which was oxidized with selenium dioxide to give ethyl p-chlorobenzoylglyoxalate. An equimolar mixture of p-chlorobenzoylglyoxalate, ethylenediamine monohydrochloride and sodium acetate in alcohol was heated under reflux for 2–3 hours. After removing the solvent by evaporation under reduced pressure, the residue was taken up in ether and the ethereal solution was washed with aqueous sodium bicarbonate. Evaporation of the solvent afforded crude ethyl 2-p-chlorophenylpyrazine-3-carboxylate. Hydrolysis of the crude ester with alcoholic potassium hydroxide gave 2-p-chlorophenylpyrazine-3-carboxylic acid hydrate. A suspension of 2-p-chlorophenylpyrazine-3-carboxylic acid monohydrate and thionyl chloride in dry methylene chloride was refluxed for two hours on a water bath. After the solvent and excess thionyl chloride were removed by distillation under diminished pressure, the crude acid chloride was dissolved in dry benzene and precipitated by adding petroleum ether. The acid chloride (3.7 g., 0.015 mole) was reacted with 6-APA in acetone-water in the usual manner to produce sodium 6-(2-p-chlorophenylpyrazine-3-carboxamide)penicillanate.

This product was found to inhibit *Staph. aureus* Smith at about 1.0–1.6 mcg./ml., to inhibit *Staph. aureus* BX–1633, which is highly resistant to benzylpenicillin, at about 3.1–6.3 mcg./ml. and to exhibit versus *Staph. aureus* BX–1633 in mice a $CD_{50}$ of about 80 mgm./kg. upon intramuscular injection.

EXAMPLE 5

*Method of preparation of sodium 6-[3-(p-methoxyphenyl) pyrazine-2-carboxamido]penicillanate*

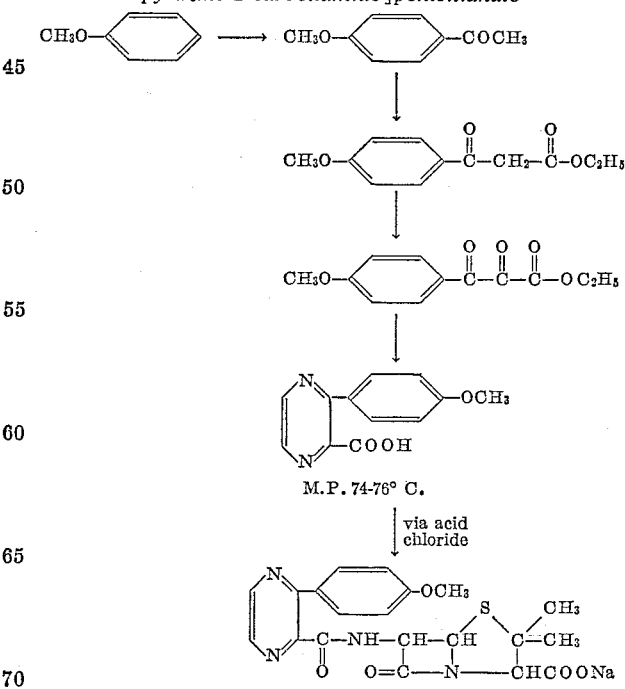

M.P. 74-76° C.

via acid chloride p-Methoxyacetophenone was prepared by the Friedel-Craft reaction. Ethyl p-methoxybenzoylacetate (B.P. 145–165° C./4 mm.) was obtained by refluxing p-methoxyacetophenone and ethyl carbonate in the presence of sodium ethoxide, followed by removal of ethanol in vacuo. Oxidation of the α-methylene group of the ester was carried out using selenium dioxide (B.P. 150–157° C./2 mm.).

2-(p-methoxyphenyl)pyrazine - 3-carboxylic acid was prepared by the reaction of p-methoxybenzoylglyoxylate and ethylenediamine dihydrochloride in alcohol in the presence of sodium acetate. Ethyl 2-(p-methoxyphenyl)-5,6-dihydropyrazine-3-carboxylate was not isolated, but the desired pyrazinecarboxylic acid and p-anisic acid were obtained by hydrolysis of the oily product with alcoholic potassium hydroxide.

*Analysis.*—Calc'd for $C_{10}H_{10}N_2O_3 \cdot H_2O$: C, 58.06; H, 4.87; N, 11.27. Found: C, 58.07; H, 4.80; N, 11.20, 11.07.

Dehydrogenation seemed to occur in the course of reaction of α,β-diketoester with diamine. The acid was converted to the acid chloride with thionyl chloride in dry benzene. The excess of thionyl chloride and the solvent were distilled off in vacuum.

The acid was dried by azeotropic distillation with benzene. Thionyl chloride was also used in methylene chloride to prepare the acid chloride of this acid; the resulting acid chloride which showed the carbonyl absorption at 1765 cm.$^{-1}$ in IR spectrum was reacted with 6–APA by the usual acid chloride method to yield sodium 6-[3-(p-methoxyphenyl)pyrazine-2 - carboxamido]penicillanate as an almost colorless powder. The carboxylate band (1605 cm.$^{-1}$) of this penicillin was quite strong as compared with the β-lactam band (1770 cm.$^{-1}$) and the side chain amide band (1670 cm.$^{-1}$). It seemed to be due to overlap with phenyl skeletal vibration which was enhanced by the methoxyl group attached to the ring.

A suspension of 2-(p-methoxyphenyl)pyrazine-3-carboxylic acid hydrate in methylene chloride was refluxed with thionyl chloride for four hours and 2-(p-methoxyphenyl)pyrazine-3-carbonyl chloride was obtained as a yellow precipitate melting at 83–88° C., yield 4.8 g. (85%). The acid chloride was combined with 6–APA in an aqueous acetone solution to give the sodium salt of the penicillin, yield 3.0 g. (35%). Assay: NH$_2$OH, 709 mcg./mg.; iod., 710 mcg./mg.; cup, 65μ./mg.

This product was found to inhibit *Staph. aureus* Smith at about 0.8 mcg./ml., to inhibit *Staph. aureus* BX–1633, which is highly resistant to benzylpenicillin, at about 1.56–3.1 mcg./ml., to exhibit versus *Staph. aureus* BX–1633 in mice a CD$_{50}$ of about 35–45 mgm./kg. upon intramuscular injection and to be quite stable in acid (having a half-life of 7.75 hours at pH 2 and 37° C. compared to 10 minutes for benzylpenicillin in a comparative experiment).

EXAMPLE 6

*Method of preparation of sodium 6-[3-(p-methylthiophenyl)pyrazine-2-carboxamido]penicillanate and sodium 6-[3-(p-methylsulfonylphenyl)pyrazine-2-carboxamido]penicillanate*

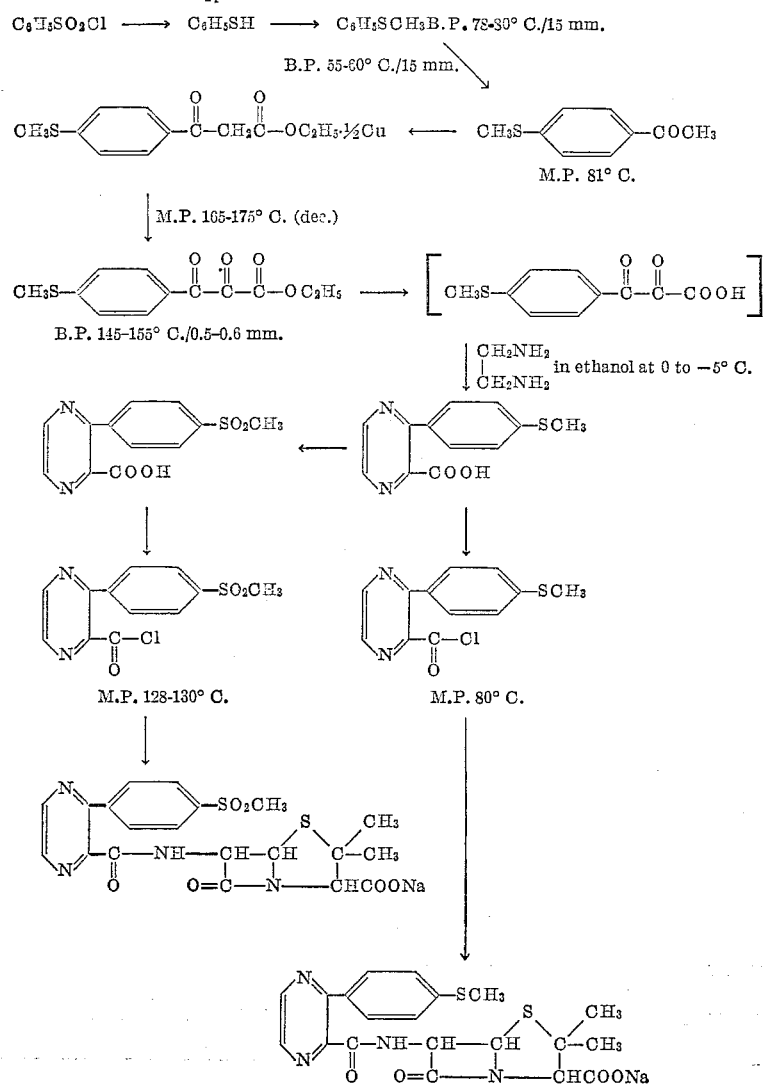

Thiophenol was prepared from benzenesulfonyl chloride according to the method described in Organic Synthesis Col. vol. I, p. 504. Thioanisol was acetylated with acetic anhydride in the presence of anhydrous aluminum chloride according to Noller and Adams [J. Amer. Chem. Soc., 46, 1892 (1924)] to give p-methylthioacetophenone which was reacted with diethyl oxalate and sodium ethoxide in the usual manner employed in the preparation of p-methoxy and p-chlorobenzoylacetates.

Ethyl p-methylthiobenzoylacetate was successfully isolated as green-colored copper salt. The copper salt was decomposed with acetic acid to give free ethyl p-methylthiobenzoylacetate, which was oxidized with selenium dioxide in dioxane. The IR spectrum of the residual oil after removing selenium and solvent, shows formation of p-methylthiobenzoylglyoxylate. Broadening of carbonyl bands both at 1745 and 1675 cm.$^{-1}$ and appearance of a new band at 920 cm.$^{-1}$ as compared with the spectrum of ethyl p-methylthiobenzoylacetate are the same tendency as in the case of conversion from ethyl p-methoxybenzoylacetate to ethyl p-methoxybenzoylglyoxylate.

A solution of ethyl p-methylthiobenzoylglyoxylate (2.5 g., 0.01 mole) in 40 ml. of ethanol was reacted with a solution of an equimolar ethylenediamine in 20 ml. of ethanol at 0–2° C. for three hours with stirring and 2.5 g. of a white precipitate melting at 88–89° C. was obtained. The IR spectrum has an ester carbonyl band at 1730 cm.$^{-1}$ and a complicated band at about 3300 cm.$^{-1}$ due to NH and/or OH, and a carbonyl band of benzoylglyoxylate at 1740 cm.$^{-1}$ and 1670 cm.$^{-1}$ disappeared. This fact suggests formation of an intermediate hydropyrazine ring.

Condensation of p-methylthiobenzoylglyoxalate with ethylenediamine gave intermediate compound A or B, both of which were converted into compound C by recrystallization from ethanol. Each of compounds A, B and C was converted to 2-(p-methylthiophenyl)pyrazine-3-carboxylic acid through intermediate compounds D and E as shown in Chart I. Experimental conditions are given in Table II and the properties of compounds A–E in Table I. Compound E was identified as ethyl 2-(p-methylthiophenyl)pyrazine-3-carboxylate, which was also prepared from the corresponding acid chloride and ethanol. The pyrazine acid was obtained as a monohydrate, which was converted by recrystallization from benzene into a product solvating one mole of benzene. M.P. 75–80° C.

*Analysis.*—Calc'd for $C_{12}H_{10}N_2O_2S \cdot C_6H_6$: C, 66.64; H, 4.97; N, 8.64. Found: C, 66.30, 66.64; H, 5.05, 5.09; N, 8.65, 8.86. Hydrate:

$\lambda^{EtOH}_{max.}$ 305 mµ
($\epsilon$ 16,200), $\nu_{C=O}$ 1680 cm.$^{-1}$; Benzene solvate:

$\lambda^{EtOH}_{max.}$ 306 mµ
($\epsilon$ 14,200), $\nu_{C=O}$ 1725 cm.$^{-1}$.

TABLE I

| M.P. (° C.) | Compd. A, 87–90 | Compd. B, 94 | Compd. C, 108–111 | Compd. D, oil | Compd. E, oil |
|---|---|---|---|---|---|
| IR: | | | | | |
| $\nu_{NH/OH}$ (cm.$^{-1}$) | 3,310; 3,380; 3,460 | 3,300 | 3,280 | None | None |
| $\nu_{C=O}$ (cm.$^{-1}$) | 1,730 | 1,710; 1,760 | 1,755 | 1,740 | 1,735 |
| UV: | | | | | |
| $\lambda^{EtOH}_{max.}$ (mµ) | 314 | No data | 270.5 | 265; 324 | 306 |
| E 1% 1 cm. | 494 | | 333 | 210; 185 | 535 ($\epsilon$14,900) |

TABLE II

| Expt. No. | Starting Material | First Step Reagents and Conditions | First Step Product | Second Step Reagents and Conditions | Second Step Product | Third Step Reagents and Conditions | Yield of Pyrazine Acid |
|---|---|---|---|---|---|---|---|
| 213-107 | Compd. B, 0.5 g. | EtOH 50 ml., reflux, overnight. | Compd. D | EtOH 40 ml., KOH 0.5 g., reflux, 4 hrs. | Pyrazine Acid. | | 100 mg. |
| 213-108 | Compd. B, 2 g. | EtOH 200 ml., reflux, 10 hrs. | Compd. D | EtOH 160 ml., KOH 1 g., reflux, 4 hrs. | Pyrazine Acid. | | 130 mg. |
| 213-109 | Compd. A, 1 g. | Benzene 120 ml., reflux, overnight. | Compd. D | c. HCl 100 ml., H₂O 200 ml., room temp. | (*) | | |
| 213-110 | Compd. A, 1 g. | Benzene 100 ml., reflux, 3.5 hrs. | Compd. D | EtOH 50 ml., KOH 0.5 g., reflux, 3 hrs. | ? | | |
| 213-111 | Compd. A, 0.5 g. | EtOH 100 ml., reflux, 15 hrs. | Compd. D | EtOH 50 ml., KOH 0.5 g., reflux, 3.5 hrs. | ? | | |
| 213-112 | Compd. A, 0.5 g. | Benzene 50 ml., Pyridine 1 drop, reflux, 15 hrs. | Compd. D | Benzene 50 ml., Alumina 5 g., room 2 hrs. | Compd. E | EtOH 50 ml., KOH 0.5 g., reflux, 3 hrs. | 367 mg. |
| 213-113 | Compd. A, 1 g. | Benzene 50 ml., Alumina 5 g., room temp., 2 hrs. | Compd. D | Benzene 50 ml., Alumina 5 g., room temp., 2 hrs. | Compd. E | EtOH 50 ml., KOH 0.5 g., reflux, 3 hrs. | 283 mg. |
| 213-115 | Compd. C, 0.5 g. | EtOH 50 ml., KOH 0.5 g., reflux, 4 hrs. | ? | | | | |
| 213-116 | Compd. C, 2 g. | Benzene 100 ml., 4 hrs. | Compd. D | Benzene 100 ml., Alumina 10 g., room temp., 2.5 hrs. | Compd. E | EtOH 100 ml., KOH 1 g., reflux, 3.5 hrs. | 400 mg. |
| 213-117 | Compd. A, 2 g. | Benzene 100 ml., 3 hrs. | Compd. D | Benzene 100 ml., Alumina 10 g. room temp., 2 hrs. | Compd. E | EtOH 100 ml., KOH 1 g., reflux, 3 hrs. | 557 mg. |
| 213-118 | Compd. A, 6 g. | Benzene 300 ml., reflux, overnight. | Compd. D | Benzene 300 ml., Alumina 30 g., room temp., 3.5 hrs. | Compd. E | EtOH 300 ml., KOH 3 g., reflux, 3 hrs. | 2.18 g. |
| 213-132 | Compd. C, 1.8 g. | EtOH 20 ml., SeO₂ 0.4 g., room temp., 3 hrs. | Compd. E | | | | 0.5 g. |

*p-Methylthiobenzoylglyoxylic acid was recovered.

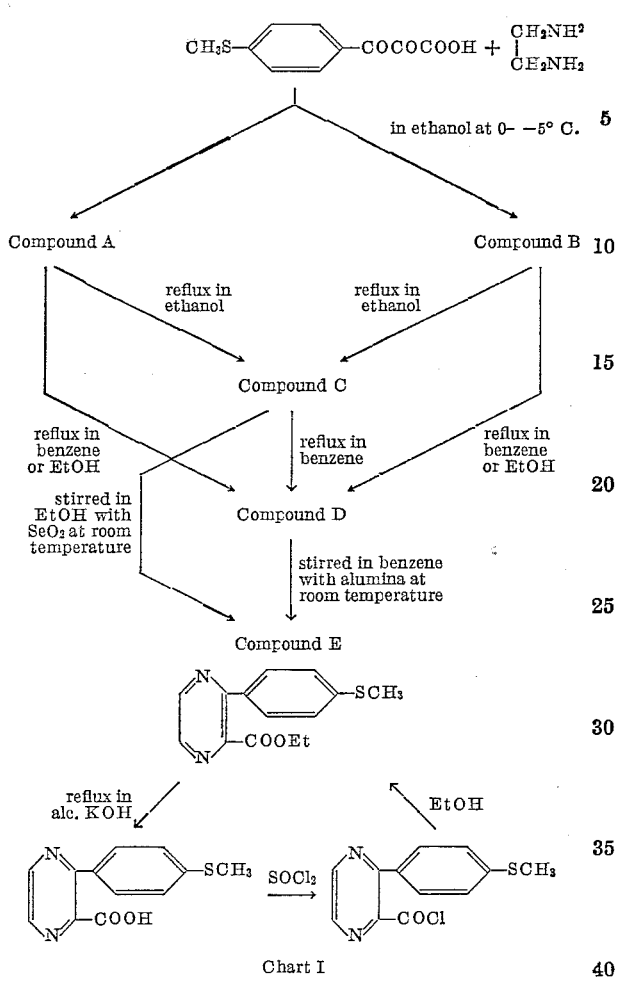

Chart I

2 - (p - methylthiophenyl)pyrazine - 3 - carboxylic acid (benzene solvate) was converted into the corresponding acid chloride, which was reacted with 6-APA in the usual manner in acetone-water to give sodium 6-[3-(p-methylthiophenyl)pyrazine - 2 - carboxamido]penicillanate. Assay: $NH_2OH$, 762 mcg./mg.; iodine, 526 mcg./mg.; cup, 54 μ./mg. This product was found to inhibit *Staph. aureus* Smith at about 0.78–0.156 mcg./ml., to inhibit *Staph. aureus* BX–1633, which is highly resistant to benzylpenicillin, at about 1.56–3.13 mcg./ml. and to exhibit versus *Staph. aureus* BX–1633 in mice a $CD_{50}$ of about 13 mgm./kg. upon intramuscular injection.

2 - (p - methylthiophenyl)pyrazine - 3 - carboxylic acid (monohydrate) was repeatedly prepared and then oxidized with potassium permanganate to 2-(p-methylsulfonylphenyl)pyrazine-3-carboxylic acid, which was obtained in various forms according to conditions of precipitation and recrystallization solvents as shown in the following table.

The 2 - (p - methylsulfonylphenyl)pyrazine - 3 - carboxylic acid was converted via its acid chloride in the usual manner to sodium 6-[3-(p-methylsulfonylphenyl)-pyrazine-2-carboxamido]penicillanate. This product was found to inhibit *Staph. aureus* Smith at about 1.56 mcg./ml., to inhibit *Staph. aureus* BX–1633, which is highly resistant to benzylpenicillin, at about 3.13 mcg./ml., to exhibit versus *Staph. aureus* Smith in mice a $CD_{50}$ of about 6.25 mgm./kg. upon intramuscular injection and to be quite stable in acid (having a half-life of greater than five hours at pH 2 and 37° C. compared to 15 minutes for benzylpenicillin in a comparative experiment).

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. A compound selected from the group consisting of an acid of the formula

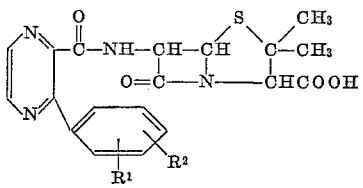

wherein $R^1$ and $R^2$ are each a member selected from the group consisting of hydrogen, trifluoromethyl, chloro, bromo, (lower)alkylthio, (lower)alkylsulfonyl, (lower) alkyl and (lower)alkoxy and nontoxic, pharmaceutically acceptable salts thereof.

2. A compound of the formula

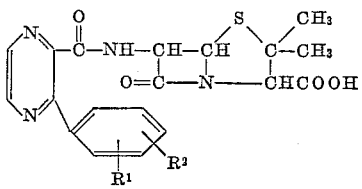

wherein $R^1$ and $R^2$ represent (lower)alkyl.

3. A compound of the formula

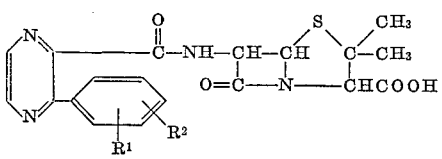

wherein $R^1$ and $R^2$ represent (lower)alkoxy.

|  | M.P. (° C.) | | | | | |
|---|---|---|---|---|---|---|
|  | A, 170–171 | | | B, 174–175 | | |
|  | Found | | Calc'd [1] | Found | | Calc'd [2] |
| Anal.: | | | | | | |
| C (percent) | 48.71 | 48.40 | 48.64 | 51.74 | 51.91 | 51.84 |
| H (percent) | 3.93 | 3.87 | 4.08 | 4.88 | 5.01 | 4.97 |
| N (percent) | 9.21 | 9.31 | 9.46 | 8.55 | 8.46 | 8.64 |

[1] Calc'd for $C_{12}H_{10}N_2O_4S \cdot H_2O$.
[2] Calc'd for $C_{12}H_{10}N_2O_4S \cdot C_2H_5OH$.
A—Product precipitated by acidification of a diluted solution or recrystallized from water.
B—Product recrystallized from ethanol.
C—The product precipitated by acidification of a concentrated solution melted at 166–167° C.

4. A compound of the formula

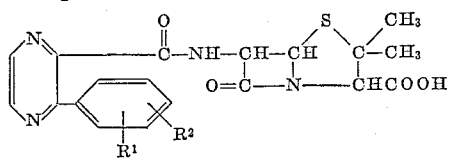

wherein R¹ and R² represent chloro.

5. A compound of the formula

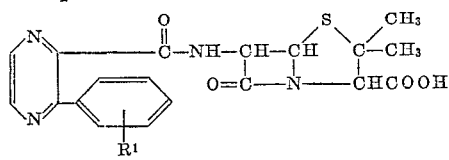

wherein R¹ represents (lower)alkyl.

6. A compound of the formula

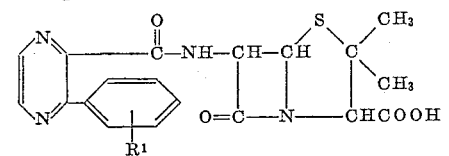

wherein R¹ represents chloro.

7. A compound of the formula

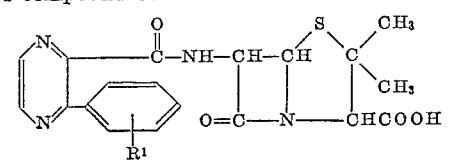

wherein R¹ represents (lower)alkoxy.

8. A compound of the formula

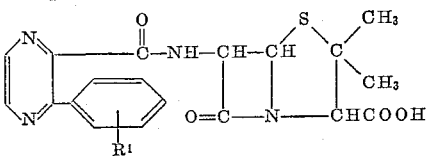

wherein R¹ represents trifluoromethyl.

9. 6 - (2' - phenylpyrazine-3-carboxamido)penicillanic acid.

10. 6 - [3 - (o - chlorophenylpyrazine-2-carboxamido] penicillanic acid.

11. 6 - [3 - (p-chlorophenyl)pyrazine-2-carboxamido] penicillanic acid.

12. 6 - [3-(p-methoxyphenyl)pyrazine-2-carboxamido] penicillanic acid.

13. 6 - [3 - (p - methylthiophenyl)pyrazine-2-carboxamido]penicillanic acid.

14. 6 - [3-(p-methylsulfonylphenyl)pyrazine-2-carboxamido]penicillanic acid.

References Cited by the Applicant

UNITED STATES PATENTS 2,520,088  8/1950  Jones.
2,941,995  6/1960  Doyle et al.
2,951,839  9/1960  Doyle et al.

OTHER REFERENCES

Jones: J. Amer. Chem. Soc. 71, 78–81 (1949).
Karmas and Spoerri: J. Amer. Chem. Soc. 74, 1580–1384 (1952).
Karmas and Spoerri: J. Amer. Chem. Soc. 78, 2141–2144 (1956).

NICHOLAS S. RIZZO, *Primary Examiner.*